(12) United States Patent
Bhatia et al.

(10) Patent No.: US 9,043,527 B2
(45) Date of Patent: May 26, 2015

(54) PCI EXPRESS CHANNEL IMPLEMENTATION IN INTELLIGENT PLATFORM MANAGEMENT INTERFACE STACK

(71) Applicant: American Megatrends, Inc., Norcross, GA (US)

(72) Inventors: Anurag Bhatia, Lilburn, GA (US); Rama Bisa, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 276 days.

(21) Appl. No.: 13/734,549

(22) Filed: Jan. 4, 2013

(65) Prior Publication Data

US 2014/0195711 A1 Jul. 10, 2014

(51) Int. Cl.
| | |
|---|---|
| *G06F 13/42* | (2006.01) |
| *G06F 13/12* | (2006.01) |
| *G06F 15/17* | (2006.01) |
| *G06F 13/10* | (2006.01) |
| *G06F 13/40* | (2006.01) |
| *G06F 13/38* | (2006.01) |
| *G06F 3/06* | (2006.01) |

(52) U.S. Cl.
CPC .......... *G06F 13/105* (2013.01); *G06F 13/4027* (2013.01); *G06F 13/4221* (2013.01); *G06F 13/385* (2013.01); *G06F 15/17* (2013.01); *G06F 2213/0026* (2013.01); *G06F 3/0664* (2013.01)

(58) Field of Classification Search
CPC ............ G06F 13/4221; G06F 13/4027; G06F 13/385; G06F 13/105; G06F 15/17; G06F 2213/0026; G06F 3/0667
USPC .......................................................... 710/313
See application file for complete search history.

(56) References Cited

U.S. PATENT DOCUMENTS

| | | | | |
|---|---|---|---|---|
| 8,069,257 B1 * | 11/2011 | Bhatia et al. | ................... | 709/230 |
| 8,819,321 B2 * | 8/2014 | Butcher et al. | ................ | 710/107 |
| 2011/0302343 A1 * | 12/2011 | Butcher et al. | ................ | 710/107 |
| 2013/0346666 A1 * | 12/2013 | Chang et al. | ................... | 710/313 |
| 2014/0281070 A1 * | 9/2014 | Natu et al. | ..................... | 710/105 |

FOREIGN PATENT DOCUMENTS

EP    2146282 A2 *    1/2010   ................ G06F 9/50

* cited by examiner

*Primary Examiner* — Ryan Stiglic
(74) *Attorney, Agent, or Firm* — Morris Manning & Martin, LLP; Tim Tingkang Xia, Esq.

(57) ABSTRACT

Certain embodiments of the present disclosure are directed to a baseboard management controller (BMC) that includes a PCI express (PCIe) interface controller configured to provide access to a PCIe channel over a PCIe link, and firmware. The firmware includes a PCIe module being configured to access the PCIe channel through the PCIe interface controller and registered as a PCIe function. A software stack of the BMC communicates, through the PCIe module, with a PCIe device over the PCIe channel.

25 Claims, 4 Drawing Sheets

PCI EXPRESS CHANNEL IMPLEMENTATION IN INTELLIGENT PLATFORM MANAGEMENT INTERFACE STACK

FIELD

The present disclosure relates generally to a baseboard management controller, and more specifically to PCI express channel implementation in an Intelligent Platform Management Interface stack of the baseboard management controller.

BACKGROUND

Computers are often linked together through networks to allow the resources of a computer at one location to be utilized by users located at a different location. In a distributed environment such as this, computers known as servers perform various tasks for client computers that communicate with the servers over a network. Servers enable sharing of files and other resources between client computers and the server. As an example, a world wide web ("web") server may provide text, graphics, and other resources to client computers over the Internet.

It is often necessary to manage the operation of a server computer. For instance, it is often desirable to view information regarding the relative health of a server computer. This is especially true for server computers that maintain resources that are utilized by a large number of client computers, such as within a corporate network or the internet. For many conventional systems, the technician that needs to view the screen displays and interact with the server being managed is required to be physically located at the site of the server. However, it is not always feasible for a technician to be physically present at the location of the server computer.

For example, a system administrator of a corporate network may be present at one location while the servers of the corporate network may be spread around the country or even the globe. To effectively manage the servers on the corporate network, the system administrator must be able to monitor each of the server computers, regardless of their location. Because the system administrator cannot be physically present at each server to be managed, effective management of the server computers becomes very difficult if not impossible. As a result, it can be very costly to maintain servers located in disparate physical locations.

Some systems for remotely administering server computers utilize an integrated or add-in management device. Such a management device can provide remote access to detailed information regarding the health and status of a managed server computer. In some cases, the management device can also redirect the video output from the server computer to a remote location and allow keyboard and mouse input to be provided to the server from the remote location. In some implementations, the management device may also include a baseboard management controller ("BMC"). In general, a BMC is a microcontroller that monitors the health and operation of the computer. In one implementation, a BMC monitors health-related aspects associated with the computer such as the temperature of components within the computer, the speed of rotational components (e.g., spindle motor, CPU fan, etc.) within the system, the voltage across or applied to one or more components within the system, and the available or used capacity of memory devices within the system. Other parameters may also be monitored.

In order to make the data gathered by the BMC available to programs and to other computer systems, a standard called the Intelligent Platform Management Interface ("IPMI") has been created. IPMI is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC through an operating system or through an external connection, such as through a network or serial connection.

In order for a host computer to transfer data to, and to receive data from, a BMC, one of several system interfaces must be utilized. For instance, if the host computer desires to upgrade the firmware of the BMC, the host computer must utilize a system interface to do so. IPMI traditionally defines only three possible system interfaces: a keyboard controller style ("KCS") interface; a system management interface chip ("SMIC") interface; and a block transfer ("BT") interface. Each of these interfaces, however, can be very slow. In particular, KCS interfaces are based on a legacy keyboard controller interface that is extremely slow. Unfortunately, no other communications channels are supported by IPMI for use as a system interface.

Therefore, an unaddressed need exists in the art to address the aforementioned deficiencies and inadequacies.

SUMMARY

Certain embodiments of the present disclosure are directed to a baseboard management controller (BMC). The BMC includes a PCI express (PCIe) interface controller configured to provide access to a PCIe channel over a PCIe link, firmware, and a processor. The firmware includes a PCIe module having a data transfer unit, the data transfer unit being configured to access the PCIe channel through the PCIe interface controller and registered as a PCIe function; a software stack implementing a plurality of functions in accordance with IMPI; a PCIe driver configured to provide access to the data transfer unit; a PCIe library implementing a plurality functions utilizing, through the PCIe driver, the data transfer unit; and a PCIe handler in communication with the software stack and the PCIe library. A program of the software stack is configured to call the PCIe handler to communicate, through the PCIe library and the PCIe driver, with a PCIe device over the PCIe channel. The processor is configured to execute the firmware.

In certain embodiments, the data transfer unit is configured to establish a data transfer channel between the data transfer unit and the PCIe device over the PCIe link. In certain embodiments, the PCIe driver is configured to provide common access to the data transfer channel and is specific to a physical implementation of the PCIe interface controller.

In certain embodiments, the PCIe device is a host computer having a data transfer module registered as a PCIe function. The data transfer unit of the BMC is in communication with the data transfer module through the PCIe link and enables data transfer to and from the data transfer module through the established data transfer channel.

In certain embodiments, the PCIe handler is configured to receive a request for communication through the PCIe interface controller and to call a function of the PCIe library in response to the request. In certain embodiments, a program of the software stack is configured to send a request to the PCIe handler for transferring a file image to the data transfer module of the host computer. The PCIe handler is configured to call, in response to the request, the PCIe library to load the file image and to transfer the file image to the data transfer module through the established data transfer channel over the PCIe link.

In certain embodiments, the PCIe library is configured to provide a function that is called by a calling program and that calls the PCIe driver to detect whether data has been placed in a storage area for the calling program. The PCIe library is further configured to provide a function that calls the PCIe driver to retrieve data stored in the storage area of the data transfer unit and that transfers the retrieved data to the calling program.

Certain embodiments of the present disclosure are directed to a method for utilizing a PCIe interface at a BMC. The method includes operating a PCIe interface controller at the BMC to provide access to a PCIe channel over a PCIe link; configuring a data transfer unit of a PCIe module at the BMC to access the PCIe channel through the PCIe interface controller, and registering the data transfer unit as a PCIe function; executing, at a processor of the BMC, a software stack that implements a plurality of functions in accordance with IMPI; executing a PCIe driver to provide access to the data transfer unit; executing a PCIe library that implements a plurality functions utilizing, through the PCIe driver, the data transfer unit; executing a PCIe handler in communication with the software stack and the PCIe library; and executing a program of the software stack to call the PCIe handler to communicate, through the PCIe library and the PCIe driver, with a PCIe device over the PCIe channel.

Certain embodiments of the present disclosure are directed to a non-transitory computer storage medium having computer-executable instructions stored thereon. The instructions, when executed by a processor of a BMC, cause the processor to: operate a PCIe interface controller at the BMC to provide access to a PCIe channel over a PCIe link; execute a data transfer unit of a PCIe module at the BMC to access the PCIe channel through the PCIe interface controller, and register the data transfer unit as a PCIe function; execute a software stack that implements a plurality of functions in accordance with IMPI; execute a PCIe driver to access the data transfer unit; execute a PCIe library that implements a plurality functions utilizing, through the PCIe driver, the data transfer unit; execute a PCIe handler in communication with the software stack and the PCIe library; and execute a program of the software stack to call the PCIe handler to communicate, through the PCIe library and the PCIe driver, with a PCIe device over the PCIe channel.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
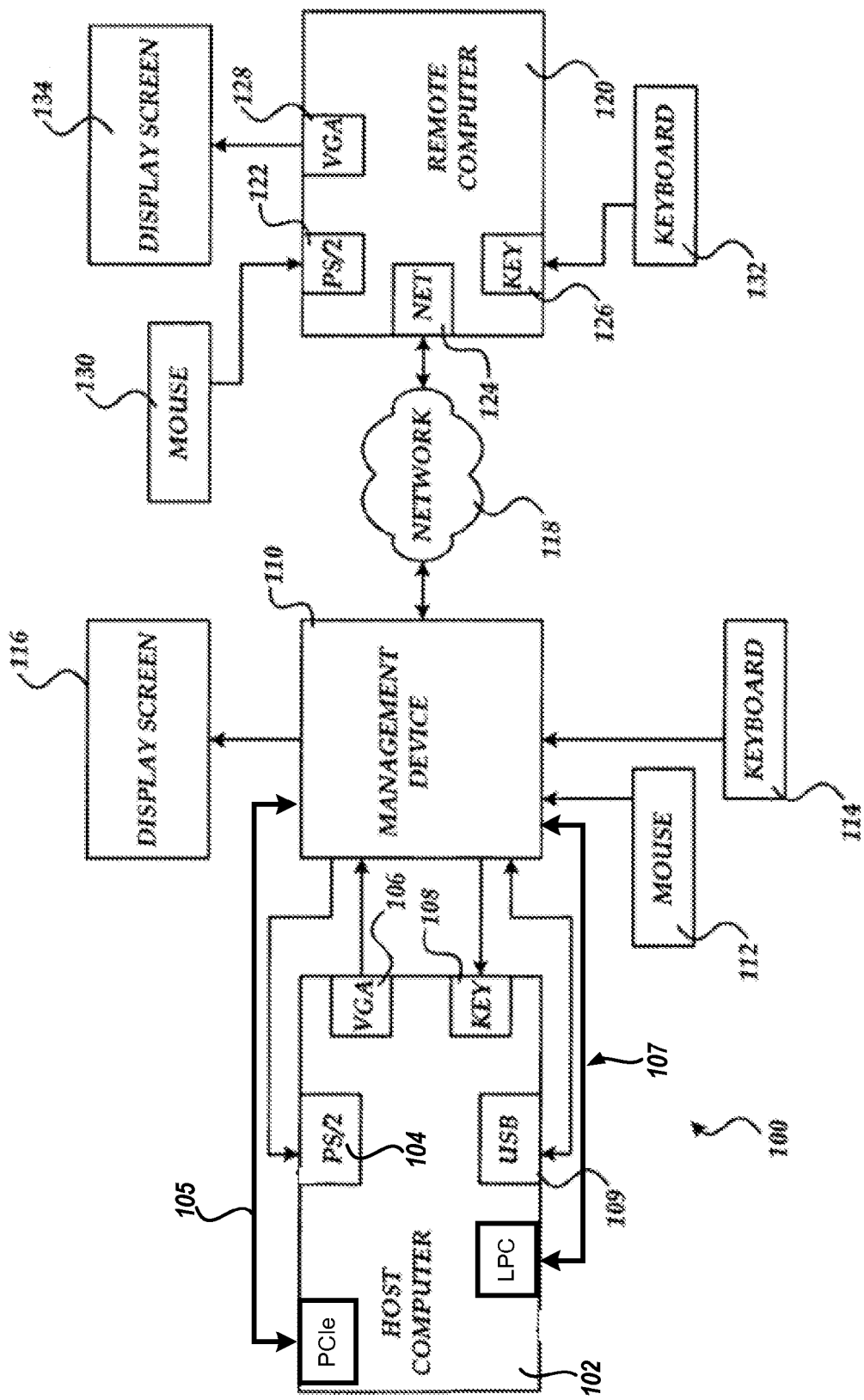
FIG. 1 illustrates a general operating environment of the management device in accordance with certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate; meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a nonexclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

FIG. 1 and the following discussion are intended to provide a brief, general description of a suitable computing environment in which the disclosure presented herein may be implemented. While the embodiments described herein will be discussed in the general context of enabling communication between a host computer and a management device, those skilled in the art will recognize that the embodiments presented herein may also be implemented in combination with other computer systems and program modules.

Generally, program modules include routines, programs, components, data structures, and other types of structures that perform particular tasks or implement particular abstract data types. Moreover, those skilled in the art will appreciate that the implementations presented herein may be practiced with other computer system configurations, including hand-held devices, multiprocessor systems, microprocessor-based or programmable consumer electronics, minicomputers, mainframe computers, and the like. The implementations presented herein may also be practiced in distributed computing environments where tasks are performed by remote processing devices that are linked through a communications network. In a distributed computing environment, program modules or data files may be located in both local and remote memory storage devices.

Turning now to FIG. 1, a general operating environment for the implementations presented herein will be described. As shown in FIG. 1, a system 100 is provided that includes a host computer 102 that is to be remotely managed. A management device 110 (also referred to alternately as a "redirection device", an "interaction device", or "management hardware") is interposed between a network 118 and the host computer 102. A remote computer 120 is linked to the network 118, and the host computer 102 may or may not be linked to the same network 118 or another network not shown. The network 118 may be of various forms such as a local area network ("LAN") or wide area network ("WAN") including the interne. A user located at the remote computer 120 may remotely manage aspects of the operation of the host computer 102 via the network 118 and the management device 110.

The management device 110 may be linked to the host computer 102 through several input/output ("I/O") connections of the host computer 102. Generally, a host computer 102 will have a video display output 106, such as an analog or digital video graphics array ("VGA") output. Also, the host computer 102 typically includes a PS/2 port or ordinary serial port configured as a mouse port 104, a keyboard port 108, and may also include a universal serial bus ("USB") port 109.

The video display output 106 provides a signal that ordinarily is passed directly to a display screen or monitor 116 where screen frames are displayed for a user present at the host computer 102. However, in the embodiment shown, the video display output 106 provides a video signal to a video input of the management device 110. The management device 110 then passes the video signal through a video output to the display screen 116 where a normal video display of screen frames occurs. Additional details regarding the operation of the management device 110 and its operations upon the video signal are described in U.S. Pat. No. 7,260,624, entitled "Systems and Methods for Establishing Interaction Between A Local computer and a Remote Computer," which is assigned to the assignee of the instant patent application and expressly incorporated herein by reference.

User input devices may also be provided for the host computer 102, including a local mouse 112 and local keyboard 114. Conventionally, the local mouse 112 and local keyboard 114 would be directly connected to the mouse port 104 and keyboard port 108 of the host computer 102. However, for the embodiment shown, the local mouse 112 and local keyboard 114 are connected to a mouse port and keyboard port, respectively, of the management device 110 and provide mouse and keyboard data to the management device 110 through these connections. The management device 110 then passes the mouse data and keyboard data to the respective ports of the host computer 102.

In addition to providing the pass-through of the video signal to the display screen 116, the management device 110 captures screen frame data from the video signal and transfers the screen frame data across the network 118 to the remote computer 120. The remote computer 120 has a network interface 124 linking the remote computer 120 to the network 118. The network interface 124 used by the remote computer 120 may be of various forms such as a dial-up modem or an Ethernet connection to a LAN. Various protocols of data transfer may be utilized between the management device 110 and the remote computer 120, such as the TCP/IP protocol ordinarily used via the Internet.

The remote computer 120 implements an application, such as a dedicated application or plug-in executing within a general purpose browser window such as a web browser, for receiving the screen frame data through the network interface 124 and providing a display on the display screen 134. The display includes the screen frame data produced by the host computer 102 that corresponds to the screen frame data transferred by the management device 110. Typically, the remote computer 120 includes a video adapter that has a video output 128 connected to the display screen 134 to provide the video signals.

To allow the user of the remote computer 120 to fully interact with the host computer 102, user interface devices such as a mouse 130 and keyboard 132 are connected to a mouse port 122 and keyboard port 126, respectively, of the remote computer 120. The user manipulates the mouse 130 and keyboard 132 to interact with the screen frame shown on the display screen 134, which may be formed wholly or in part by the screen frame data received over the network 118. When the user activity at the remote computer 120 is entered with respect to the screen frame data received from the management device, then the processing device of the remote computer 120 transfers the user activity data over the network 118 to the management device 110 that subsequently passes it to the mouse port 104 and/or keyboard port 108.

Once the host computer 102 receives the user activity data through the mouse port 104 and/or keyboard port 108, the host computer 102 then implements the user activity as if it had occurred directly through the local mouse 112 or local keyboard 114. When implemented, the user activity alters the screen frame to be displayed. Therefore, the video signal output by the video connector 106 to the management device 110 provides the screen frames that show the change caused by the user activity at the remote computer 120, such as the mouse pointer moving or typed letters appearing in an electronic document.

The management device 110 transfers the screen frame data showing the user activity to the remote computer 120 where it is then provided to the display screen 134. Thus, the user activity initially performed at the remote computer 120 is represented on the display screen 134 immediately as it is being performed by the user and then once again after updating the video display of the host computer 102 and transferring the updated screen frame back to the remote computer 120.

According to other implementations, the management device 110 may be or may also include a baseboard management controller ("BMC"). In general, a BMC is a microcontroller that monitors the health and operation of the host computer 102. In one implementation, a BMC in the management device 110 monitors health-related aspects associated with the computer 102 such as the temperature of components within the computer, the speed of rotational components (e.g., spindle motor, CPU fan, etc.) within the computer 102, the voltage across or applied to one or more components within the computer 102, and the available or used capacity of memory devices within the computer 102. Other parameters may also be monitored.

In order to make the data gathered by the BMC available from the management device 110 to programs executing on the computer 102 and to other computer systems such as the remote computer 120, the firmware of the management device 110 is compatible with the Intelligent Platform Management Interface ("IPMI"). IPMI is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC through an operating system or through an external connection, such as through a network or serial connection. Additional details regarding IPMI can be found in the IPMI Specification (Version 2.0), which is publicly available from INTEL CORPORATION, and which is incorporated herein by reference.

In order for an IPMI client application executing on the host computer 102 to transfer IPMI messages to the management device 110, one of several system interfaces must be utilized. For instance, if an IPMI client application executing on the computer 102 needs to transmit information to the management device 110 regarding current CPU usage, the IPMI client application must utilize a "system interface" to do so. The IPMI Specification defines several possible system interfaces: a keyboard controller style ("KCS") interface, a system management interface chip ("SMIC") interface, a block transfer ("BT") interface, and SMBus System Interface (SSIF). These interfaces can be very slow. In particular, KCS interfaces are typically implemented over a LPC bus 107 and based on a legacy keyboard controller interface that is extremely slow. In addition, the management device can also communicate with the host computer 102 through a PCI express link 105.

Figure 2:
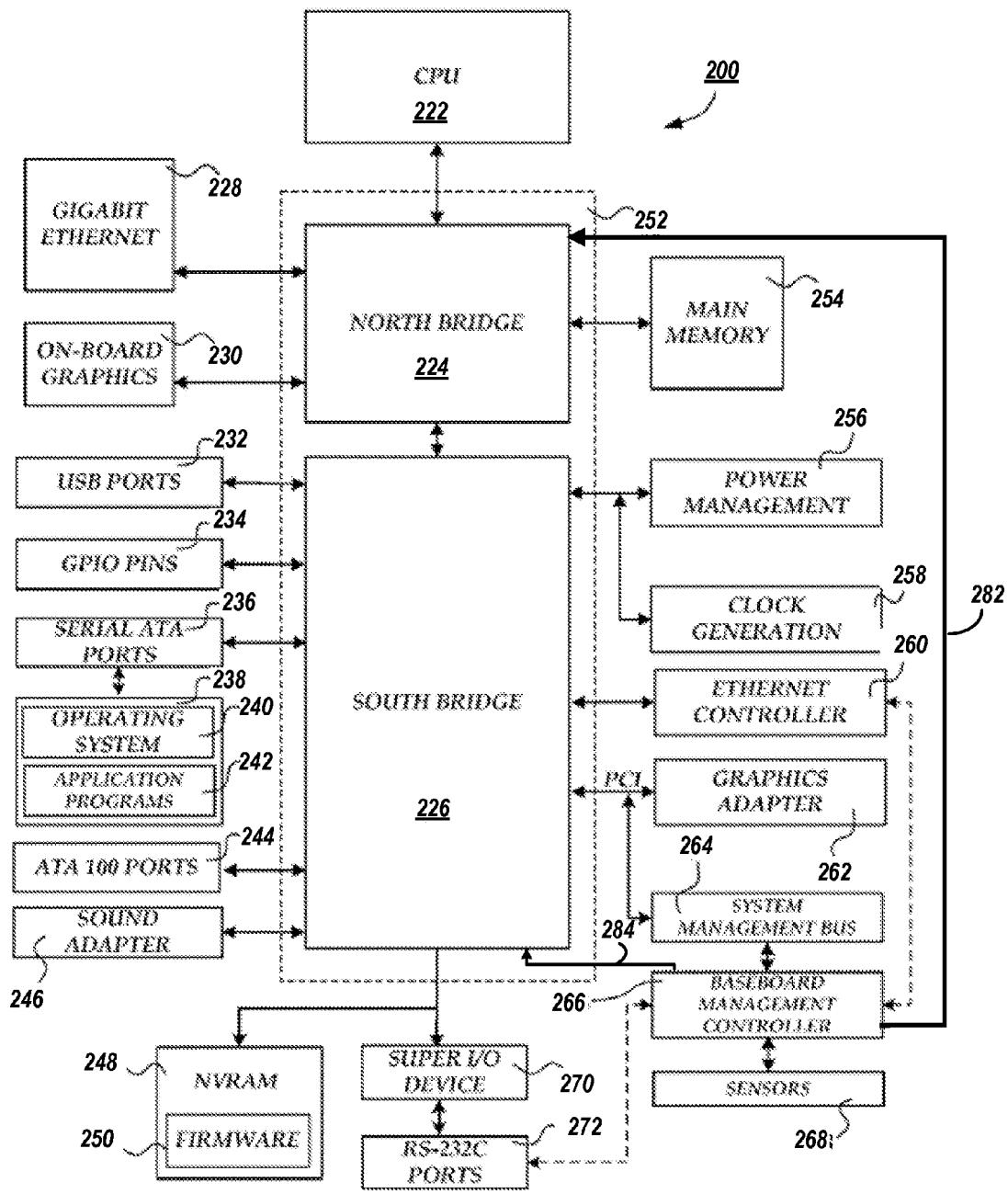
FIG. 2 illustrates a computer architecture for the various computing systems utilized in accordance with certain embodiments of the present disclosure.

Turning now to FIG. 2, an illustrative computer architecture for the various computing systems utilized in the embodiments described herein will be provided. It should be appreciated that although the embodiments described herein are discussed in the context of server computers, virtually any type of computing device may be utilized. It should be appreciated that the architecture shown in FIG. 2 may be utilized to embody the managed host computer 102, the remote computer 120, or any of the other computer systems described herein.

The illustrative architecture shown in FIG. 2 is for a computer 200 that includes a baseboard, or "motherboard", which is a printed circuit board to which a multitude of components or devices may be connected by way of a system bus or other electrical communication path. In this example, the management device is implemented by a BMC 266. In one illustrative embodiment, a CPU 222 operates in conjunction with a chipset 252. The CPU 222 is a standard central processor that performs arithmetic and logical operations necessary for the operation of the computer. The computer 200 may include a multitude of CPUs 222.

The chipset 252 includes a north bridge 224 and a south bridge 226. The north bridge 224 provides an interface between the CPU 222 and the remainder of the computer 200. The north bridge 224 also provides an interface to a random access memory ("RAM") used as the main memory 254 in the computer 200 and, possibly, to an on-board graphics adapter 230. The north bridge 224 may also include functionality for providing networking functionality through a gigabit Ethernet adapter 228. The gigabit Ethernet adapter 228 is capable of connecting the computer 200 to another computer via a network. Connections which may be made by the network adapter 228 may include LAN or WAN connections. LAN and WAN networking environments are commonplace in offices, enterprise-wide computer networks, intranets, and the Internet. The north bridge 224 is connected to the south bridge 226.

The south bridge 226 is responsible for controlling many of the input/output functions of the computer 200. In particular, the south bridge 226 may provide one or more universal serial bus ("USB") ports 232, a sound adapter 246, an Ethernet controller 260, and one or more general purpose input/output ("GPIO") pins 234. The south bridge 226 may also provide a bus for interfacing peripheral card devices such as a graphics adapter 262. In one embodiment, the bus comprises a peripheral component interconnect ("PCI") bus. The south bridge 226 may also provide a system management bus 264 for use in managing the various components of the computer 200. Additional details regarding the operation of the system management bus 264 and its connected components are provided below.

The south bridge 226 is also operative to provide one or more interfaces for connecting mass storage devices to the computer 200. For instance, according to an embodiment, the south bridge 226 includes a serial advanced technology attachment ("SATA") adapter for providing one or more serial ATA ports 236 and an ATA 100 adapter for providing one or more ATA 100 ports 244. The serial ATA ports 236 and the ATA 100 ports 244 may be, in turn, connected to one or more mass storage devices storing an operating system 240 and application programs 242, such as the SATA disk drive 238. As known to those skilled in the art, an operating system 240 comprises a set of programs that control operations of a computer and allocation of resources. An application program is software that runs on top of the operating system software, or other runtime environment, and uses computer resources to perform application specific tasks desired by the user.

The mass storage devices connected to the south bridge 226, and their associated computer-readable media, provide non-volatile storage for the computer 200. Although the description of computer-readable media contained herein refers to a mass storage device, such as a hard disk or CD-ROM drive, it should be appreciated by those skilled in the art that computer-readable media can be any available media that can be accessed by the computer 200. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 226 for connecting a "Super I/O" device 270. The Super I/O device 270 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 248 for storing the firmware 250 that includes program code containing the basic routines that help to start up the computer 200 and to transfer information between elements within the computer 200.

As described briefly above, the south bridge 226 may include a system management bus 264. The system management bus 264 may be coupled to the BMC 266. In general, the BMC 266 is a microcontroller that monitors operation of the computer system 200. In a more specific embodiment, the BMC 266 monitors health-related aspects associated with the computer system 200, such as, but not limited to, the temperature of one or more components of the computer system 200, speed of rotational components (e.g., spindle motor, CPU Fan, etc.) within the system, the voltage across or applied to one or more components within the system 200, and the available or used capacity of memory devices within the system 200. To accomplish these monitoring functions, the BMC 266 is communicatively connected to one or more components by way of the management bus 264. In an embodiment, these components include sensor devices for measuring various operating and performance-related parameters within the computer system 200.

The management bus 264 is used by the BMC 266 to request and/or receive various operating and performance-related parameters from one or more components, which are also communicatively connected to the management bus 264. For instance, in one embodiment, the management bus 264 may communicatively connects the BMC 266 to a CPU temperature sensor and a CPU fan (not shown in FIG. 2), thereby providing a means for the BMC 266 to monitor and/or control operation of these components. The BMC 266 may also include sensors 268 connected directly thereto. The BMC 266 can establish a connection with the super I/O device through the serial ports 272. The super I/O interface connects to the south bridge through a Low Pin Count (LPC) bus. The BMC 266 can also connect with the south bridge through the Ethernet controller 260. Further, the BMC can connect to the north bridge 224 through a PCI express link 282 and/or to the south bridge 226 through another PCI express link 284.

It should be appreciated that the computer 200 may comprise other types of computing devices, including hand-held computers, embedded computer systems, personal digital assistants, and other types of computing devices known to those skilled in the art. It is also contemplated that the computer 200 may not include all of the components shown in FIG. 2, may include other components that are not explicitly shown in FIG. 2, or may utilize an architecture completely different than that shown in FIG. 2.

Figure 3:
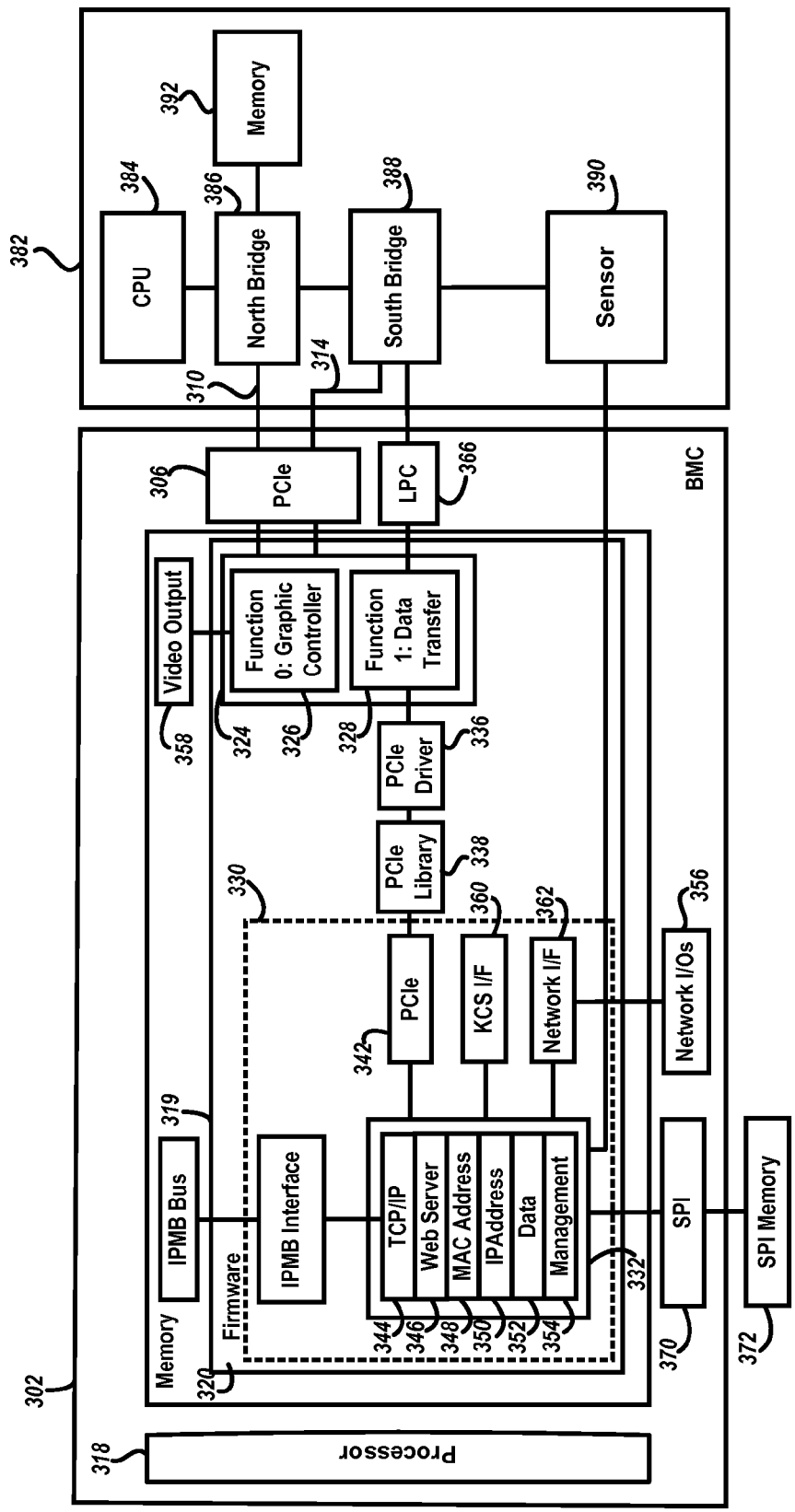
FIG. 3 schematically illustrates a BMC and a host computer 382 in accordance with certain embodiments of the present disclosure.

FIG. 3 schematically illustrates a BMC 302 and a host computer 382 in accordance with certain embodiments of the present disclosure. In this example, the management device discussed above is implemented by the BMC 302. Only some selected components shown in FIG. 2 are shown here for clarity.

In certain embodiments, the BMC 302 includes, among other things, a PCI express interface controller 306 that provides access to a PCI express link 310, 314, firmware 320 stored in a memory 319, and a processor 318. The firmware 320 include a PCI express module 324 having a data transfer unit 328. The data transfer unit 328 can access the PCI express link 310, 314 through the PCI express interface controller 306 and is registered as a PCI express function. The firmware 320 further includes IPMI compatible software 330, which contains a software stack 332 implementing a plurality of functions in accordance with IMPI. The IPMI compatible software 330 can include one or more communication interfaces such as a KCS interface 360 and a network interface 362. The KCS interface 360 is in communication with the LPC controller 366. The network interface 362 is in communication with the network controller 356. Thus, the software stack 332 can access the KCS communication channel and the network communication channel through the KCS interface 360 and the network interface 362. The software stack 332 is in communication with an IPMB bus through an IPMB interface and can communicate with other IPMI compatible devices over the IPMB bus.

The firmware 320 also includes a PCI express driver 336 configured to provide access to the data transfer unit, a PCI express library 338 implementing a plurality functions utilizing the data transfer unit 328 through the PCI express driver 336, and a PCI express handler 342 in communication with the software stack 332 and the PCI express library 338. The processor 318 is configured to execute the firmware 320. The PCI express handler 342 provides the software stack an access to a PCI express channel. A management program 354 of the software stack can call the PCI express handler 342 to communicate with a PCI express device (e.g. the host computer 382) over the PCI express link 310, 314, through the PCI express library 338 and the PCI express driver 336. The PCI express handler 342 provides functions that can be used by the software stack to utilize some specific PCI express functions. For example, the software stack can call a predefined function of the PCI express handler 342 to transfer data to a PCI express endpoint.

In certain embodiments, the software stack 332 can be a BMC stack or IPMI stack. The software stack includes a TCP/IP stack 344, a web server application program 346, and the MAC address 348 that identifies the software stack 332 as the destination of network packets addressed to the MAC address 348. Thus, by executing the web server application program 346 and the TCP/IP stack 344, and programming the network controller 356 to forward network packets addressed to the MAC address 348, the software stack 332 can receive and respond to requests for management information via a web interface. Further, because the software stack 332 has been allocated a MAC address, an IP address 350 may also be allocated to the software stack 332. The IP address 350 identifies the software stack 332 on the TCP/IP network so that network packets may be routed to and from the software stack using the IP address 350. The IP address 350 may also be allocated a domain name that may be utilized in a URL to identify one or more web pages available from the web server application program 346. In certain embodiments, the remote computer 382 can establish a network communication and upload data to the BMC 302. For example, the remote computer can upload a file, such as a BMC firmware, to the BMC 302, which in turn transfers the file to the host computer 382 through communication channels, such as the PCI express channel discussed below, that have been established between the BMC 302 and the host computer 382.

The software stack also includes a management program 354 that can configure or program the network controller to filter or pass network packets addressed to the MAC address 348 and received over the network to the software stack 332. The management program 354 also monitors, analyzes, and communicates measured operating and performance-related parameters within the host system sensed via the sensors 390 of the host computer 382. The sensors 390 measure or sense operating and performance-related parameters associated with the host computer 382 and provides this information to the software stack 332 via a system interface for analysis, and more particularly, for determination on whether an event is occurring within the host computer. The software stack 332 can be in compliance with the IPMI standard.

The BMC 302 is registered as a multi-function PCI express device. For example, the firmware 320 of the BMC 302 may have a first function, i.e. Function 0, that provides a graphic interface. In other words, the firmware 320 of the BMC 302 includes a graphic controller unit 326, which can be utilized by other components of the firmware to communicate with the graphic interface to output video signals to the video output 358. The BMC 302 has a video output port 358. The graphic interface controller unit 326 can be registered as a PCI express function. The graphic interface controller unit 326 outputs video signals to the video output port 358. The graphic interface controller unit 326 can be accessible by the host computer 382 through the PCI express link 310 between the north bridge 386 and the PCI express interface controller 306.

Figure 4:
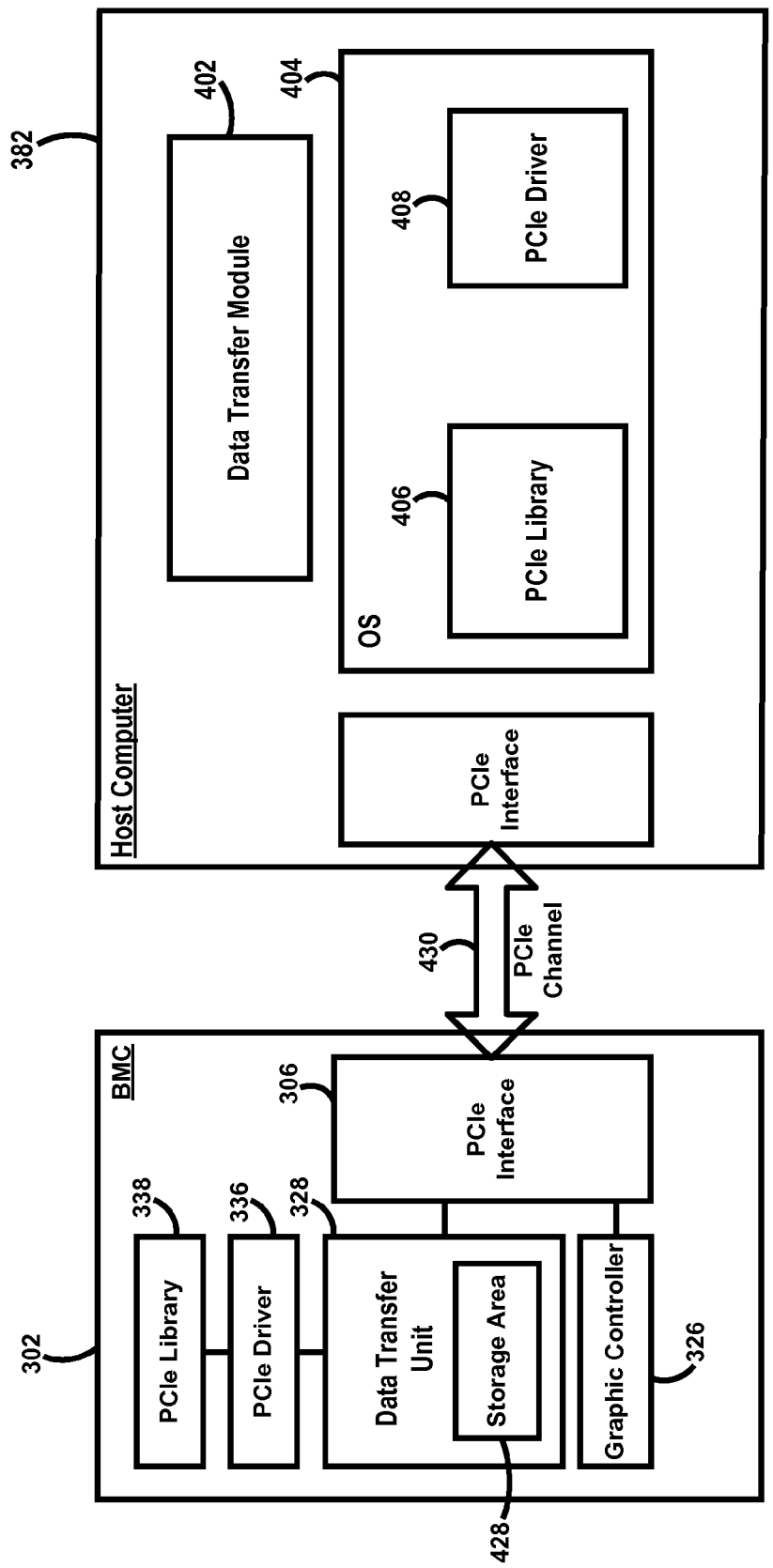
FIG. 4 illustrates functional blocks of a host computer in accordance with certain embodiments of the present disclosure.

The BMC 302 may have a second function, i.e., Function 1, that is the data transfer unit 328 and that provides a data exchange interface. The data transfer unit 328 is configured to establish a data transfer channel between the data transfer unit and another PCI express device over the PCI express link 310, 314. In certain embodiments, the other PCI express device is the host computer 382 having a data transfer module 402 registered as a PCI express function. FIG. 4 illustrates functional blocks of a host computer in accordance with certain embodiments of the present disclosure. The data transfer unit 328 of the BMC 302 is in communication with data transfer module 402 through the PCI express link 310, 314, 412 and enables data transfer to and from the data transfer module 402 through the established data transfer channel on the PCI express link. In certain embodiments, the data transfer unit 328 can receive data transmitted from the data transfer module 402 and place the received data in a storage area. The PCI express driver 336 is configured to provide access to the storage area of the data transfer unit.

In certain embodiments, the data transfer unit 326 can be initiated by the processor on a process that is separate from the process running the data transfer unit. The inter-process communication between the data transfer unit 326 and the software stack 332 can be implemented by using a shared memory or a message queue. The BMC 302 through the PCI express interface 306 is connected to the north bridge 386 and the south bridge 388 of the host computer 382 over PCI express links 310, 314. The graphic controller 326 may be also connected to the video output port 358. The software stack 332 is in communication with the graphic controller 326 and sends graphic instructions, data and/or commands to the graphic controller 326. The graphic controller 326 outputs video signals to the video output port 358. The CPU 384 of the host computer 382 has access to the graphic controller 326 through the north bridge. At the same time, the graphic controller 326 has access to the main memory 392 of the host computer 382 through the north bridge 386.

FIG. 4 illustrates selected functional blocks of the BMC 302 and the host computer 382 in accordance with certain embodiments. The PCI express data transfer unit 328, i.e., the Function 1, of the BMC 302 can be utilized by other programs or routines of the BMC firmware 320 to exchange data through the PCI express channel over links 310, 314. The BMC firmware 320 has a PCI express library module 338 and a PCI express driver module 336. The PCI express driver module 336 provides common access to the PCI express data transfer channel 430 established between the data exchange unit 328 and the data exchange module 402 of the host computer 382. The PCI express driver module 338 is specific to physical implementation of the PCI express interface 306. The PCI express driver module 336 provides a plurality of driver functions for transferring data over the PCI express channel 430. For example, those functions can be accessed through inter-process mechanisms such as a shared memory or message queue. In certain embodiments, the PCI express driver module 336 provides a set of functions, e.g., predefined in an application programming interface (API), that can be accessed by another program. For example, the API may define a data transfer function and all PCI express driver implementations are required to implement this function. Depending on the physical implementation of the PCI express interface 306, the implementation of the data transfer unit can be different and thus, the predefined functions of the PCI express driver module needs to be implemented differently in order to communicate with the data transfer unit. In certain embodiments, the PCI driver module 336 receives a data unit and an address of a destination PCI express device, then places the received data unit and address in the shared memory or message queue of the data transfer unit 328, thus informing the data transfer unit 328 that the data unit is to be transferred to the device through the PCI express channel 430.

The PCI express library module 338 may include configuration data, documentation, help data, message templates, pre-written code and subroutines, classes, values or type specifications. The PCI express library module 338 calls the PCI express driver module 336 to access and manipulate the PCI express interface 306 through the data transfer unit, which in turn communicates with the host computer 308 through the PCI express channel 430. The PCI express library module 338, for example, can have a number of subroutines that are designed to handle various tasks using the PCI express interface 306. One exemplary task is to transfer data between the BMC 302 and the host computer 382. In certain embodiments, the PCI express library module 338 provides data transfer functions implementing data transfer through the PCI express channel 430. The data transfer functions call the predefined driver functions of the PCI express driver module 336 to transfer data for example utilizing the shared memory or the message queue. For example, the PCI express library module 338 can receive a file image, construct data units containing data of the file image, receive an indication of the destination PCI express device, transmits the data units to the PCI express driver module, and informs the PCI express driver module 336 an address of the destination PCI express device.

In certain embodiments, the software stack 332 has a PCI express handler 342 that makes PCI express interfaces and functions available to the other applications or programs of the software stack. The PCI express handler 342 is in communication with the PCI express library module 338 and can call subroutines or functions of the PCI express library module 338. The PCI express handler 342 can be configured to receive requests for communication through the PCI express interface 306 and calls a function of the PCI express library module 338 in response to the request.

In certain embodiments, the management program 354 of the software stack sends a request to the PCI express handler 342 for transferring a file image from the BMC 302 to the data transfer module 402 of the host computer 382. The PCI express handler 342, in response to the request, calls the PCI express library module 338 to load the file image and then transfer the file image to the data transfer module 402 through the established PCI express data transfer channel 430 over the PCI express link 310, 314, 412.

The PCI express library module 338 utilizes the PCI express driver module 336 to communicate with the data transfer unit 328. The PCI express library module 338 provides functions that can be called by the PCI express handler 342. One function can be used to call the PCI express driver module 336 in order to detect whether data has been placed in the storage area for the PCI express handler 342. The PCI express library module 338 also provides a function that calls the PCI express driver module 336 to retrieve data stored in the storage area of the data transfer unit 328 and transfer the retrieved data to the PCI express handler 342. For example, the management program 354 of the software stack 352, in response to a indication that a file image has been transmitted to the data transfer unit 328 from the data transfer module 402 for the management program 354, can call that function of the PCI express library module 338 to retrieve the file image.

Referring to FIG. 4, in certain embodiments, a BMC firmware upgrade application, utilizing the data transfer module 402 and executed on the host computers, can initiate an upgrade transaction to upgrade the existing firmware 320 of the BMC 302 with a replacement firmware. The upgrade application can call PCI express libraries 406 and a PCI express driver 408, for example provided by the operating system 424 of the host computer 382, and a PCI express driver 408 to communicate with a PCI express interface 410, which in turn controls communication with the PCI express channel 430. In this way, the upgrade application can communicate with the data transfer unit 328 of the BMC 302, which is registered in the configuration PCI express registers of the BMC 302. The PCI express interface 410, in accordance with the PCI express specification, can include a transaction layer and a data link layer. The upgrade application calls the functions provided by the PCI express library 406 in order to communicate, through the PCI express channel 430, with the data transfer unit 328 of the BMC 302 and transfer the replacement firmware to the BMC 302. The PCI express library 406 calls the PCI driver 408 to implement its functions. In this example, the upgrade application utilizes the PCI express library 406 and driver 408 to communicate the replacement firmware to the PCI express interface 410, and instruct the PCI express interface that the replacement firmware is to be transmitted to the BMC 302. The PCI express interface 410, upon receiving the replacement firmware, construct transaction layer packets destined to the data transfer unit 326 of the BMC 302, which is a PCI express function, using the data of the replacement firmware, in accordance with the PCI express specification. The transaction layer packets are then placed in the transmit buffers of the transaction layer of the PCI express interface 306. The PCI express interface 306 then transmits the transaction layer packets, containing the data of the replacement firmware, in the transmit buffers to the data link layer. At the data link layer, the PCI interface further generates data link layer packets, which are used to assure that integrity is maintained when the transaction layer packets move between two PCI express devices, for this firmware upgrade transaction. The transaction layer packets and the data link layer packets are sent to the PCI express channel 430 and then transmitted to the BMC 302 through the PCI express link 310, 314.

The BMC 302 receives the transaction layer packets and the data link layer packets transmitted from the host computer 382 through the PCI express link 310, 314. The PCI express interface 306 at the BMC 302 then at its data link layer checks integrity of the received transaction layer packets and then places the transaction layer packets in the receipt buffers of the transaction layer. The data transfer unit 328 then retrieves the replacement firmware from the PCI express interface 306 and places the replacement firmware in its storage area 428, which is reconstructed from the data packets, of the data transfer unit 328.

Various mechanisms can be used to notify the management program 354 that the replacement firmware has been transmitted to the BMC 302 through the PCI express interface 306. The management program 354 communicates with the PCI express handler 332 in order to retrieve the replacement firmware from the PCI express module 324 of the BMC. The PCI express handler 342 calls a function or subroutine of the PCI express library module 328 implemented for retrieving data from the data transfer unit 328. The called function or subroutine of the PCI express library module 338 calls the PCI express driver module 336 to retrieve the replacement firmware from the data transfer unit 328. The management program 354 can store the replacement firmware in a Serial Peripheral Interface (SPI) memory chip 372 through an SPI interface 370. During a next booting process, the BMC 302 can load the replacement firmware from the SPI memory chip 370.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

The invention claimed is:

1. A baseboard management controller (BMC), comprising:
   a PCI express (PCIe) interface controller configured to provide access to a PCIe channel over a PCIe link;
   firmware including:
   a PCIe module having a data transfer unit and a graphic interface controller, each of the data transfer unit and the graphic interface controller being configured to access the PCIe channel through the PCIe interface controller and registered as a PCIe function;
   a software stack implementing a plurality of functions in accordance with IPMI;
   a PCIe driver configured to provide access to the data transfer unit;
   a PCIe library implementing a plurality of functions utilizing, through the PCIe driver, the data transfer unit; and
   a PCIe handler in communication with the software stack and the PCIe library, wherein a program of the software stack is configured to call the PCIe handler to communicate, through the PCIe library and the PCIe driver, with a PCIe device over the PCIe channel; and
   a processor configured to execute the firmware.

2. The baseboard management controller of claim 1, wherein the data transfer unit is configured to establish a data transfer channel between the data transfer unit and the PCIe device over the PCIe link.

3. The baseboard management controller of claim 2, wherein the PCIe driver is configured to provide common access to the data transfer channel.

4. The baseboard management controller of claim 2, wherein the PCIe driver is specific to a physical implementation of the PCIe interface controller.

5. The baseboard management controller of claim 2, wherein the PCIe device is a host computer having a data transfer module registered as a PCIe function, wherein the data transfer unit of the BMC is in communication with the data transfer module through the PCIe link and enables data transfer to and from the data transfer module through the established data transfer channel.

6. The baseboard management controller of claim 5, wherein the PCIe handler is configured to receive a request for communication through the PCIe interface controller and to call a function of the PCIe library in response to the request.

7. The baseboard management controller of claim 6, wherein a program of the software stack is configured to send a request to the PCIe handler for transferring a file image to the data transfer module of the host computer, wherein the PCIe handler is configured to call, in response to the request, the PCIe library to load the file image and to transfer the file image to the data transfer module through the established data transfer channel over the PCIe link.

8. The baseboard management controller of claim 5, wherein the data transfer unit is configured to receive data transmitted from the data transfer module and place the received data in a storage area, wherein the PCIe driver is configured to provide access to the storage area of the data transfer unit.

9. The baseboard management controller of claim 8, wherein the PCIe library is configured to provide a function that is called by a calling program and that calls the PCIe driver to detect whether data has been placed in the storage area for the calling program, wherein the PCIe library is configured to provide a function that calls the PCIe driver to retrieve data stored in the storage area of the data transfer unit and that transfers the retrieved data to the calling program.

10. The baseboard management controller of claim 5, wherein a program of the software stack is configured to, in response to an indication that a file image is transmitted to the data transfer unit from the data transfer module for the management program, call a function of the PCIe library to retrieve the file image.

11. The baseboard management controller of claim 1, wherein the data transfer unit is configured to utilize a shared memory or a message queue.

12. The baseboard management controller of claim 11, wherein the PCIe driver is configured to provide a plurality of driver functions for transferring data over the PCIe link through the shared memory or message queue.

13. The baseboard management controller of claim 12, wherein the PCIe library is configured to provide a plurality of data transfer functions implementing data transfer through the PCIe channel, wherein the plurality of data transfer functions call the predefined driver functions of the PCIe driver to transfer data to the data transfer unit through the shared memory or the message queue.

14. The baseboard management controller of claim 11, wherein the PCI driver is configured to
   receive a data unit and an address of a destination PCIe device; and
   transfer the received data unit and the address to the data transfer unit through the shared memory or message queue of.

15. The baseboard management controller of claim 1, wherein the PCIe library is configured to
   receive a file image;
   construct a plurality of data unit containing data of the file image;
   receive an indication of the destination PCIe device;
   transmit the data units to the PCI driver; and
   inform the PCIe driver an address of the destination PCIe device.

16. The baseboard management controller of claim 1, further comprising a video output port, wherein the graphic interface controller is configured to output video signals to the video output port, wherein the graphic interface controller is configured to be accessible by the PCIe device through the PCIe link.

17. A method for utilizing a PCI express (PCIe) interface at a baseboard management controller (BMC), comprising:
   operating a PCIe interface controller at the BMC to provide access to a PCIe channel over a PCIe link;
   configuring a data transfer unit and a graphic interface controller of a PCIe module at the BMC to access the PCIe channel through the PCIe interface controller, and registering each of the data transfer unit and the graphic interface controller as a PCIe function;
   executing, at a processor of the BMC, a software stack that implements a plurality of functions in accordance with IPMI;
   executing a PCIe driver to provide access to the data transfer unit;

executing a PCIe library that implements a plurality of functions utilizing, through the PCIe driver, the data transfer unit;

executing a PCIe handler in communication with the software stack and the PCIe library; and executing a program of the software stack to call the PCIe handler to communicate, through the PCIe library and the PCIe driver, with a PCIe device over the PCIe channel.

18. The method of claim 17, comprising establishing a data transfer channel between the data transfer unit and the PCIe device over the PCIe link.

19. The method of claim 18, wherein the PCIe driver is configured to provide common access to the data transfer channel and is specific to a physical implementation of the PCIe interface controller.

20. The method of claim 18, wherein the PCIe device is a host computer having a data transfer module registered as a PCIe function, wherein the data transfer unit of the BMC is in communication with the data transfer module through the PCIe link and enables data transfer to and from the data transfer module through the established data transfer channel.

21. The method of claim 20, comprising:

receiving, at the PCIe handler, a request for communication through the PCIe interface controller;

calling a function of the PCIe library in response to the request;

sending, from the software stack, a request to the PCIe handler for transferring a file image to the data transfer module of the host computer;

calling, by the PCIe handler in response to the request, the PCIe library to load the file image; and transferring the file image to the data transfer module through the established data transfer channel over the PCIe link.

22. A non-transitory computer storage medium having computer-executable instructions stored thereon which, when executed by a processor of a baseboard management controller (BMC), cause the processor to:

operate a PCIe interface controller, at the BMC, to access a PCIe channel over a PCIe link;

execute a data transfer unit and a graphic interface controller of a PCIe module, at the BMC, to access the PCIe channel through the PCIe interface controller, and register each of the data transfer unit and the graphic interface controller as a PCIe function;

execute a software stack that implements a plurality of functions in accordance with IPMI;

execute a PCIe driver to access the data transfer unit;

execute a PCIe library that implements a plurality of functions utilizing, through the PCIe driver, the data transfer unit;

execute a PCIe handler in communication with the software stack and the PCIe library; and execute a program of the software stack to call the PCIe handler to communicate, through the PCIe library and the PCIe driver, with a PCIe device over the PCIe channel.

23. The non-transitory computer storage medium of claim 22, wherein the instructions, when executed, cause the processor to send a request, at a program of the software stack, to the PCIe handler for transferring a file image to a data transfer module of the PCIe device; and call, at the PCIe handler in response to the request, the PCIe library to load the file image and to transfer the file image to the data transfer module through an established data transfer channel over the PCIe link.

24. The non-transitory computer storage medium of claim 22, wherein the instructions, when executed, cause the processor to:

provide, at the PCIe library, a function that is called by a calling program and that calls the PCIe driver to detect whether data has been placed in a storage area of the data transfer unit for the calling program; and provide, at the PCIe library, a function that calls the PCIe driver to retrieve data stored in the storage area and that transfers the retrieved data to the calling program.

25. The non-transitory computer storage medium of claim 22, wherein the instructions, when executed, cause the processor to:

receive, at the PCIe handler, a request for communication through the PCIe interface controller;

call a function of the PCIe library in response to the request;

send, from the software stack, a request to the PCIe handler for transferring a file image to the data transfer module of the PCIe device;

call, by the PCIe handler in response to the request, the PCIe library to load the file image; and transfer the file image to the data transfer module through an established data transfer channel over the PCIe link.

* * * * *